United States Patent
Kubo

(10) Patent No.: US 11,104,363 B2
(45) Date of Patent: Aug. 31, 2021

(54) TRAIN OPERATION PLANNING SUPPORT SYSTEM

(71) Applicants: Toshiba Digital Solutions Corporation, Kawasaki (JP); Toshiba Digital & Consulting Corporation, Kawasaki (JP)

(72) Inventor: Hideki Kubo, Fuchu (JP)

(73) Assignees: Toshiba Digital Solutions Corporation, Kawasaki (JP); Toshiba Digital & Consulting Corporation, Kawasaki (JP)

( * ) Notice: Subject to any disclaimer, the term of this patent is extended or adjusted under 35 U.S.C. 154(b) by 279 days.

(21) Appl. No.: 16/273,536

(22) Filed: Feb. 12, 2019

(65) Prior Publication Data
US 2020/0039548 A1     Feb. 6, 2020

Related U.S. Application Data

(63) Continuation of application No. PCT/JP2018/028713, filed on Jul. 31, 2018.

(51) Int. Cl.
*B61L 27/00* (2006.01)
*G08G 1/127* (2006.01)
*B61L 25/02* (2006.01)

(52) U.S. Cl.
CPC ......... *B61L 27/0016* (2013.01); *B61L 25/023* (2013.01); *B61L 27/0077* (2013.01); *G08G 1/127* (2013.01)

(58) Field of Classification Search
CPC ............... B61L 27/0016; B61L 25/023; B61L 27/0077; B61L 27/0055; G08G 1/127; G06Q 10/0631; G06Q 50/30; G06Q 10/06

(Continued)

(56) References Cited

U.S. PATENT DOCUMENTS

| | | | | |
|---|---|---|---|---|
| 2014/0034787 A1* | 2/2014 | Ueda | ................... | B61L 27/0027 246/2 R |
| 2017/0057529 A1* | 3/2017 | Kubo | .................. | B61L 27/0022 |
| 2017/0061794 A1* | 3/2017 | Nishimura | .......... | B61L 15/0072 |

FOREIGN PATENT DOCUMENTS

| | | |
|---|---|---|
| CN | 106794854 A | 5/2017 |
| JP | 58-180375 | 10/1983 |

(Continued)

OTHER PUBLICATIONS

Written Opinion dated Oct. 30, 2018 in PCT/JP2018/028718 filed Jul. 31, 2018.

(Continued)

*Primary Examiner* — Muhammad Shafi
(74) *Attorney, Agent, or Firm* — Oblon, McClelland, Maier & Neustadt, L.L.P.

(57) ABSTRACT

According to one embodiment, a train operation planning support system displays a timetable of a train in which a first required time and a first buffer time are placed for running time of the train and a second required time and a second buffer time are placed for dwell time of the train. The first required time is time required for a train running between a departure station and an arrival station. The first buffer time is buffer time obtained by subtracting the first required time from running time of the train set as a target value. The second required time is time required for the train stopping at the arrival station. The second buffer time is buffer time obtained by subtracting the second required time from dwell time of the train which is set as a target value.

4 Claims, 18 Drawing Sheets

(58) Field of Classification Search
USPC .......................................................... 701/19
See application file for complete search history.

(56) References Cited

FOREIGN PATENT DOCUMENTS

| JP | 61-70574 | 4/1986 |
| JP | 5185408 | 4/2013 |
| JP | 5911694 | 4/2016 |
| JP | 2018-27729 | 2/2018 |

OTHER PUBLICATIONS

Shoichiro Yoshida, et al., "Generation of a Train Plan Robust Against Delay Using Margin Hour Redistribution Method", Operations Research (vol. 57, No. 4), Apr. 2012, 22 pages (with English translation).

\* cited by examiner

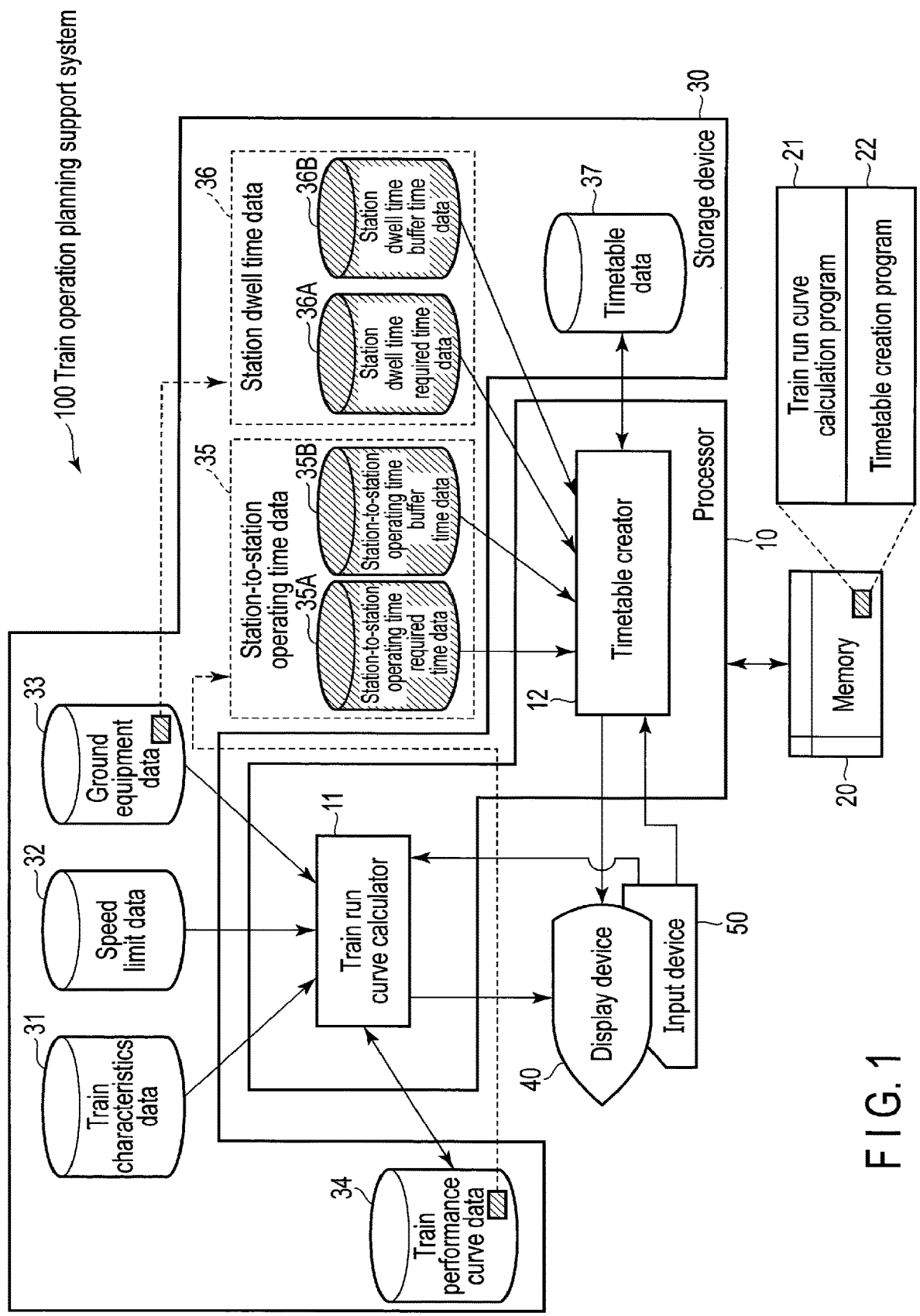
F I G. 1

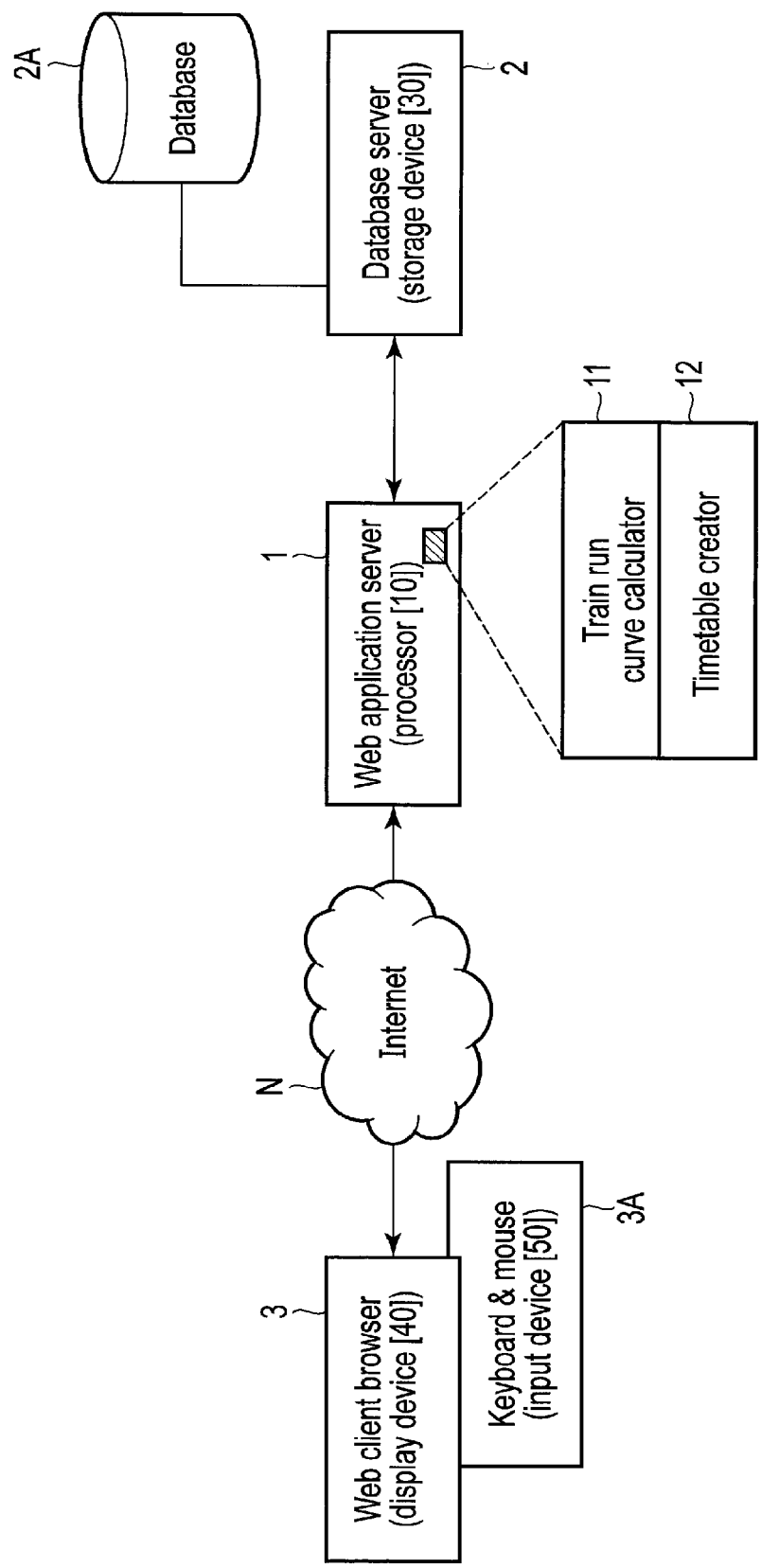
F I G. 2

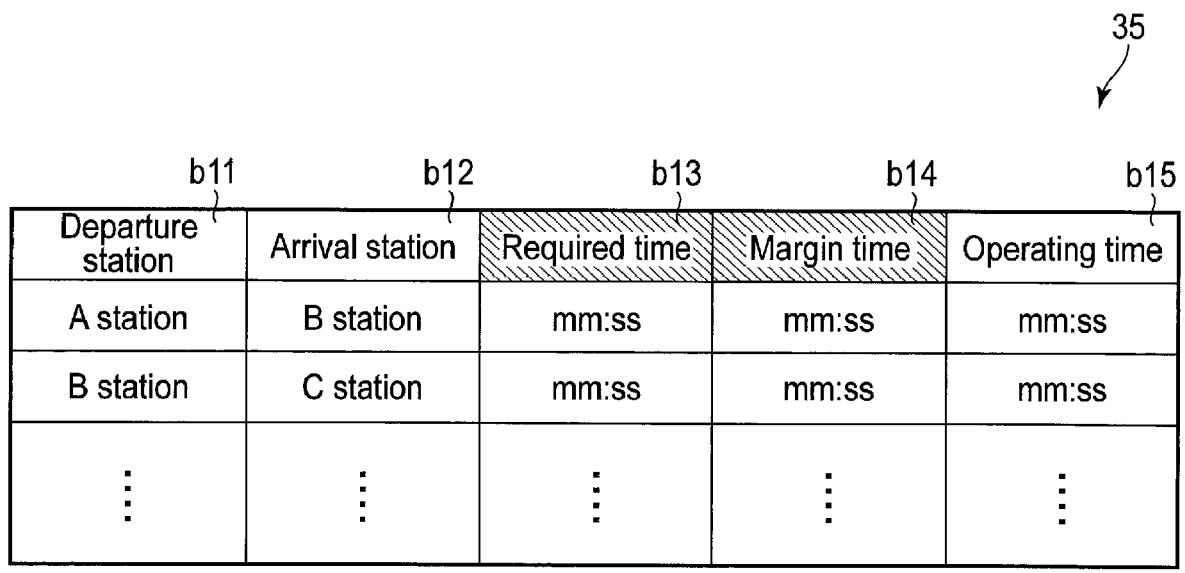
F I G. 4
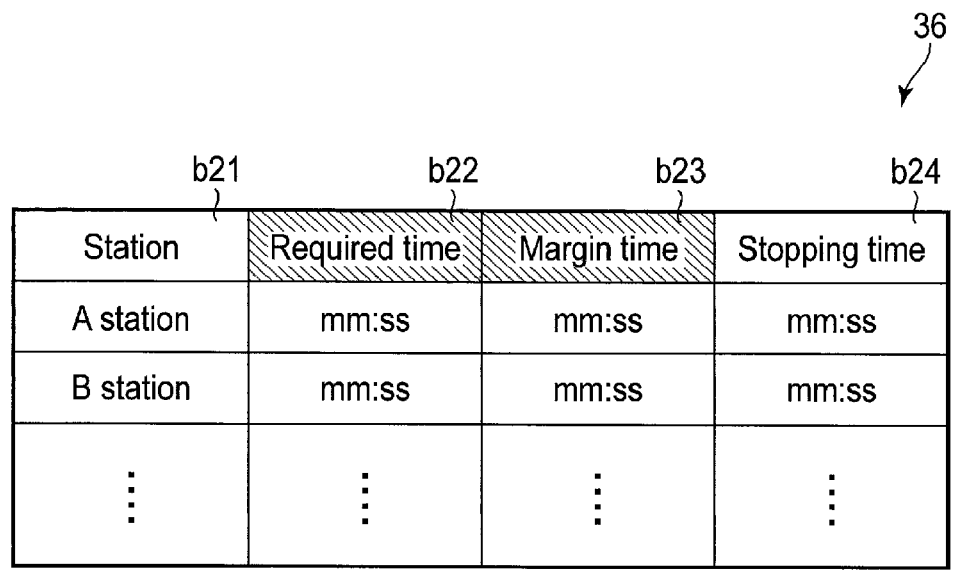
F I G. 5

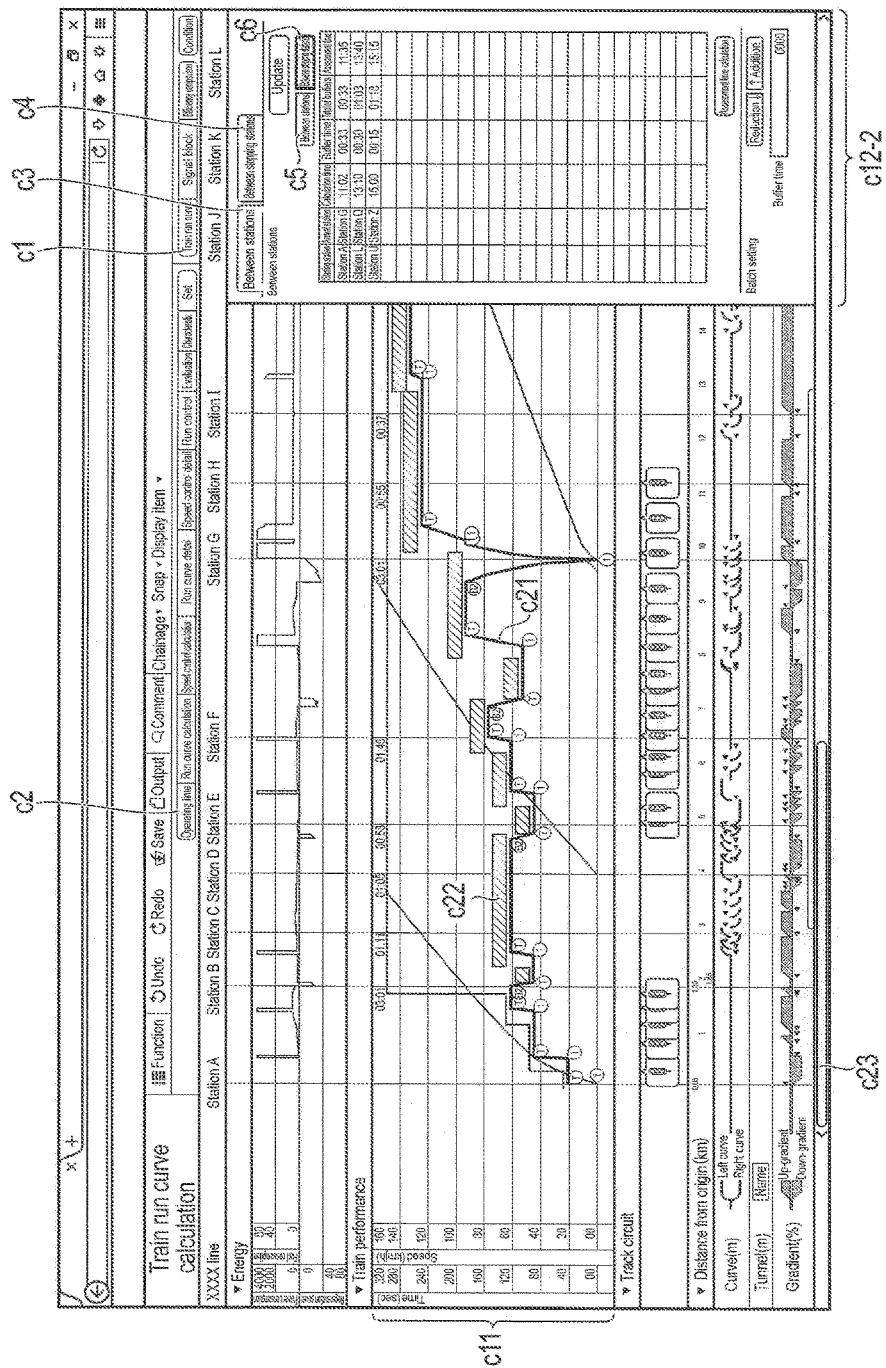
F I G. 7

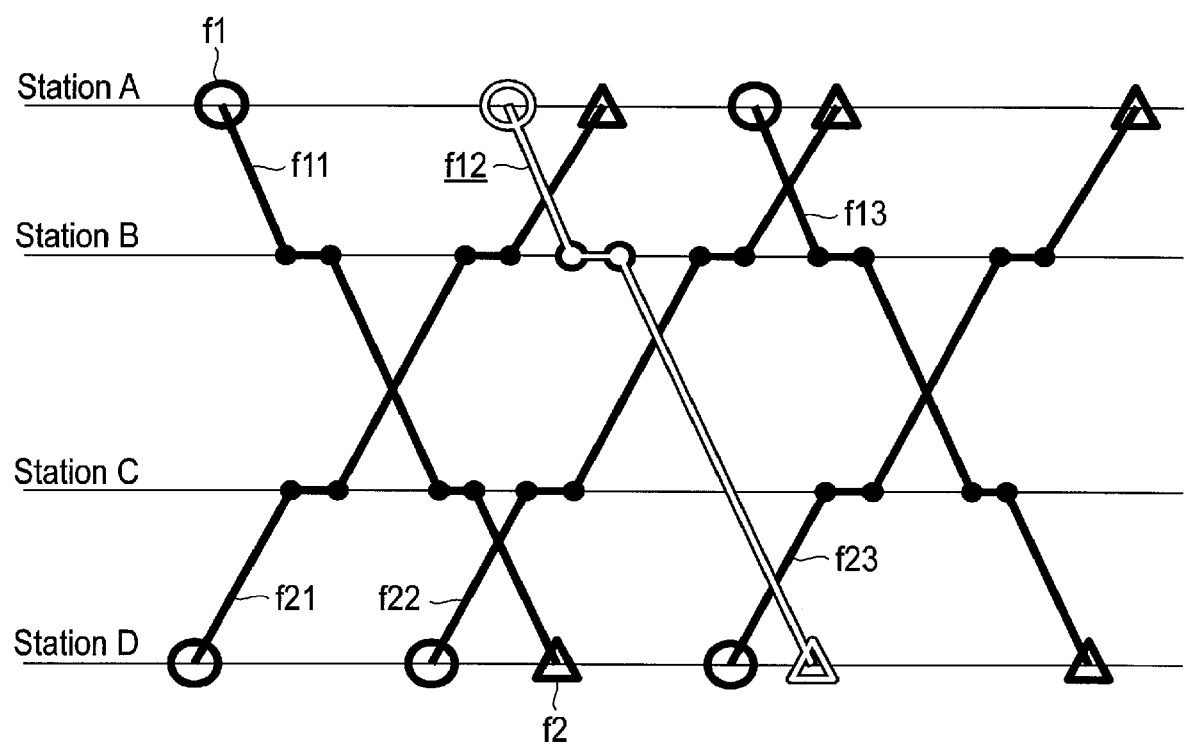
F I G. 12

Timetable mode

| Station | Track number | Pass or stop | Arrival time | Departure time | Operating time | Stopping time |
|---|---|---|---|---|---|---|
| Station A | 1 | Stop |  | 08:00:00 |  |  |
| Station B |  | Stop | 08:01:45 | 08:02:30 | 00:01:45 | 00:00:45 |
| Station C |  | Pass |  | 08:03:10 | 00:00:40 | 00:00:00 |
| Station D | 2 | Stop | 08:05:20 | 08:06:15 | 00:02:10 | 00:00:55 |
| Station E |  | Pass |  | 08:07:25 | 00:01:10 | 00:00:00 |
| Station F |  | Stop | 08:09:10 | 08:10:40 | 00:01:45 | 00:01:30 |

F I G. 13B

Margin time mode

| Station | Track number | Pass or stop | Required time | Margin time | Total of buffers | Stop/ operation |
|---|---|---|---|---|---|---|
| Station A | 1 | Stop |  |  |  |  |
| ↓ |  |  | 00:01:40 | 00:00:05 | 00:00:05 | 00:01:45 |
| Station B |  | Stop | 00:00:30 | 00:00:15 | 00:00:20 | 00:00:45 |
| ↓ |  |  | 00:00:35 | 00:00:05 | 00:00:25 | 00:00:40 |
| Station C |  | Pass | 00:00:00 | 00:00:00 | 00:00:25 | 00:00:00 |
| ↓ |  |  | 00:02:00 | 00:00:10 | 00:00:35 | 00:02:10 |
| Station D | 2 | Stop | 00:00:40 | 00:00:15 | 00:00:50 | 00:00:55 |
| ↓ |  |  | 00:01:05 | 00:00:05 | 00:00:55 | 00:01:10 |

F I G. 13C

| Required time | Buffer time | Operating time or dwell/turnback time |
|---|---|---|
| 00:02:13 | 00:00:17 | 00:02:30 |

 Input to change to 00:02:22
(change to large value within range of dwell/turnback time)

| Required time | Buffer time | Operating time or dwell/turnback time |
|---|---|---|
| 00:02:22 | 00:00:08 | 00:02:30 |

F I G. 14A

| Required time | Buffer time | Operating time or dwell/turnback time |
|---|---|---|
| 00:02:13 | 00:00:17 | 00:02:30 |

 Input to change to 00:02:44
(change to large value within range of dwell/turnback time)

| Required time | Buffer time | Operating time or dwell/turnback time |
|---|---|---|
| 00:02:44 | -00:00:14 | 00:02:30 |

F I G. 14B

| Required time | Buffer time | Operating time or dwell/turnback time |
|---|---|---|
| 00:02:13 | 00:00:17 | 00:02:30 |

 Input to change to 00:02:09 (change to small value)

| Required time | Buffer time | Operating time or dwell/turnback time |
|---|---|---|
| 00:02:09 | <u>00:00:21</u> | 00:02:30 |

F I G. 14C

| Required time | Buffer time | Operating time or dwell/turnback time |
|---|---|---|
| 00:02:13 | 00:00:17 | 00:02:30 |

 Input to change to -00:00:10 (change to negative value)

| Required time | Buffer time | Operating time or dwell/turnback time |
|---|---|---|
| <u>00:00:00</u> | <u>00:02:30</u> | 00:02:30 |

Required time cannot be positive value

F I G. 14D

| Required time | Buffer time | Operating time or dwell/turnback time |
|---|---|---|
| 00:02:13 | 00:00:17 | 00:02:30 |
Input to change to 00:00:19
| Required time | Buffer time | Operating time or dwell/turnback time |
|---|---|---|
| <u>00:02:11</u> | 00:00:19 | 00:02:30 |
F I G. 15A
| Required time | Buffer time | Operating time or dwell/turnback time |
|---|---|---|
| 00:02:13 | 00:00:17 | 00:02:30 |
Input to change to 00:00:11
| Required time | Buffer time | Operating time or dwell/turnback time |
|---|---|---|
| <u>00:02:19</u> | 00:00:11 | 00:02:30 |
F I G. 15B

| Required time | Buffer time | Operating time or dwell/turnback time |
|---|---|---|
| 00:02:13 | 00:00:17 | 00:02:30 |

Input to change to 00:02:55

| Required time | Buffer time | Operating time or dwell/turnback time |
|---|---|---|
| 00:00:00 | 00:02:30 | 00:02:30 |

Required time cannot exceed stop/turnback time

FIG. 15C

| Required time | Buffer time | Operating time or dwell/turnback time |
|---|---|---|
| 00:02:13 | 00:00:17 | 00:02:30 |

Input to change to 00:03:11 (change to large value)

| Required time | Buffer time | Operating time or dwell/turnback time |
|---|---|---|
| 00:02:13 | 00:00:58 | 00:03:11 |

Round up in units of 5 seconds

| Required time | Buffer time | Operating time or dwell/turnback time |
|---|---|---|
| 00:02:13 | 00:01:02 | 00:03:15 |

FIG. 16A

| Required time | Buffer time | Operating time or dwell/turnback time |
|---|---|---|
| 00:02:13 | 00:00:17 | 00:02:30 |

⇩ Input to change to 00:02:16 (change to small value)

| Required time | Buffer time | Operating time or dwell/turnback time |
|---|---|---|
| 00:02:13 | 00:00:03 | 00:02:16 |

⇩ Round up in units of 5 seconds

| Required time | Buffer time | Operating time or dwell/turnback time |
|---|---|---|
| 00:02:13 | 00:00:07 | 00:02:20 |

F I G. 16B

| Required time | Buffer time | Operating time or dwell/turnback time |
|---|---|---|
| 00:02:13 | 00:00:17 | 00:02:30 |

⇩ Input to change to 00:02:02 (change to value that is smaller than required time)

| Required time | Buffer time | Operating time or dwell/turnback time |
|---|---|---|
| 00:02:13 | -00:00:11 | 00:02:02 |

⇩ Round up in units of 5 seconds

| Required time | Buffer time | Operating time or dwell/turnback time |
|---|---|---|
| 00:02:13 | -00:00:08 | 00:02:05 |

F I G. 16C

TRAIN OPERATION PLANNING SUPPORT SYSTEM

CROSS-REFERENCE TO RELATED APPLICATIONS

This application is a Continuation Application of PCT Application No. PCT/JP2018/028713, filed Jul. 31, 2018, the entire contents of which are incorporated herein by reference.

FIELD

Embodiments described herein relate generally to a train operation planning support system.

BACKGROUND

A variety of software programs are used to support train operation planning of railroad companies. As one of the software programs, there is a software program to create a train timetable that is referred to as a timetable software program or the like.

In the current timetable software programs, departure time at stations is managed, and a schedule is set by the total of running time between stations and dwell time at stations. In some timetable software programs, arrival time only at stations is further managed, and a schedule is set using departure time and arrival time at stations.

Timetables are required to have robustness to a delay caused in running time between stations and dwell time at stations. The robustness of timetables depends upon the amount of buffer time contained in running time between stations and dwell time at stations. Robust timetables are timetables capable of absorbing a delay caused in running time between stations and dwell time at stations by buffer time. For example, even though a long delay caused in dwell time at a certain station cannot be absorbed by buffer time contained in the dwell time at the station, if it is gradually absorbed by buffer time contained in the subsequent running time between stations and dwell time at stations, the delay can be compensated.

In current timetable software, buffer time to absorb a delay is included in running time between stations, dwell time at stations, the total of running time between stations and dwell time at stations, etc., and is not specified. On the other hand, the robustness of timetables depending upon the amount of buffer time contained in running time between stations and dwell time at stations cannot be evaluated unless the amount of buffer time is calculated. In other words, the current timetable software has the problem in which the robustness of timetables cannot be evaluated numerically.

If the amount of buffer time increases, the robustness of timetables improves, but the quick deliverability (time required to go to the destination) decreases. It is thus favorable that the amount of buffer time contained in running time between stations and dwell time at stations can be adjusted appropriately in consideration of the speed of trains.

BRIEF DESCRIPTION OF THE DRAWINGS

FIG. 1 is a diagram showing an example of a configuration of a train operation planning support system according to an embodiment.

FIG. 2 is a diagram showing an example in which the train operation planning support system according to the embodiment is constructed by a plurality of computers.

FIG. 4 is a diagram showing an example of a format of station-to-station running time data for use in the train operation planning support system according to the embodiment.

FIG. 5 is a diagram showing an example of a format of station dwell time data for use in the train operation planning support system according to the embodiment.

FIG. 7 is a second diagram showing an example of a screen displayed while the train operation planning support system according to the embodiment is calculating a train run curve.

FIG. 8 is a first diagram showing an example of a screen displayed while the train operation planning support system according to the embodiment is creating a timetable.

FIG. 9 is a second diagram showing an example of a screen displayed while the train operation planning support system according to the embodiment is creating a timetable.

FIG. 10 is a third diagram showing an example of a screen displayed while the train operation planning support system according to the embodiment is creating a timetable.

FIG. 11 is a fourth diagram showing an example of a screen displayed while the train operation planning support system according to the embodiment is creating a timetable.

FIG. 12 is a diagram showing an example of displaying a timetable by the train operation planning support system according to the embodiment.

FIG. 13B is a diagram showing an example of presenting arrival time, departure time, running time and dwell time in timetable mode by the train operation planning support system according to the embodiment.

FIG. 13C is a diagram showing an example of presenting buffer time of running time and buffer time of dwell time in buffer time mode by the train operation planning support system according to the embodiment.

FIG. 14A is a first diagram illustrating editing of buffer time in chain reaction to editing of time required for station dwell time in the train operation planning support system according to the embodiment.

FIG. 14B is a second diagram illustrating editing of buffer time in chain reaction to editing of time required for station dwell time in the train operation planning support system according to the embodiment.

FIG. 14C is a third diagram illustrating editing of buffer time in chain reaction to editing of time required for station dwell time in the train operation planning support system according to the embodiment.

FIG. 14D is a fourth diagram illustrating editing of buffer time in chain reaction to editing of time required for station dwell time in the train operation planning support system according to the embodiment.

FIG. 15A is a first diagram illustrating editing of buffer time and dwell time in chain reaction to editing of buffer time for station dwell time in the train operation planning support system according to the embodiment.

FIG. 15B is a second diagram illustrating editing of buffer time and dwell time in chain reaction to editing of buffer time for station dwell time in the train operation planning support system according to the embodiment.

FIG. 15C is a third diagram illustrating editing of buffer time and dwell time in chain reaction to editing of buffer time for station dwell time in the train operation planning support system according to the embodiment.

FIG. 16A is a first diagram illustrating editing of buffer time and dwell/turnback time in chain reaction to editing of dwell/turnback time for station dwell time in the train operation planning support system according to the embodiment.

FIG. 16B is a second diagram illustrating editing of buffer time and dwell/turnback time in chain reaction to editing of dwell/turnback time for station dwell time in the train operation planning support system according to the embodiment.

FIG. 16C is a third diagram illustrating editing of buffer time and dwell/turnback time in chain reaction to editing of dwell/turnback time for station dwell time in the train operation planning support system according to the embodiment.

DETAILED DESCRIPTION

Figure 3:
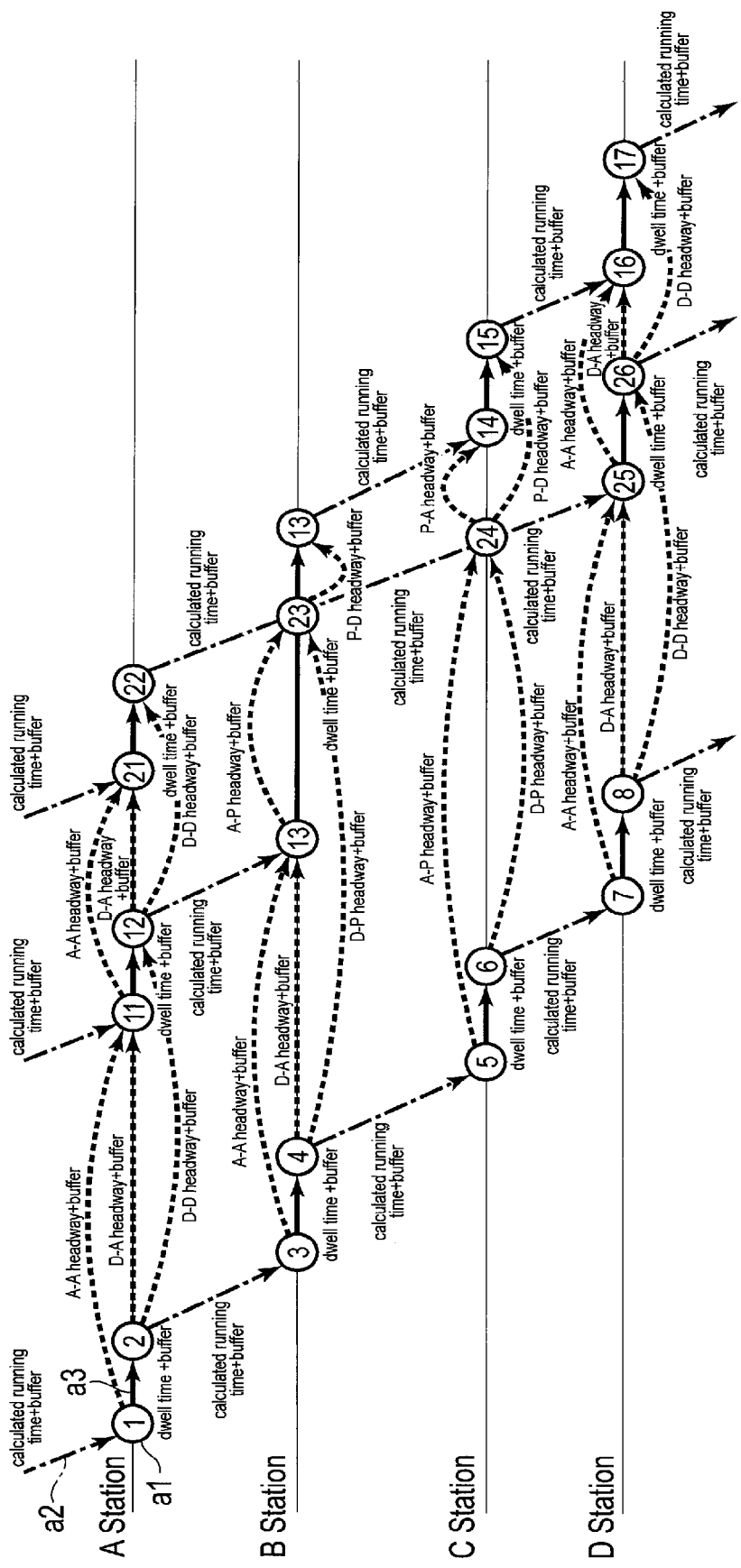
FIG. 3 is a diagram illustrating the principle of creating a timetable whose robustness is secured.

Various embodiments will be described hereinafter with reference to the accompanying drawings.

In general, according to one embodiment, a train operation planning support system includes an acquisition processor and a display processor. The acquisition processor acquires station-to-station running time required time data, station-to-station running time buffer time data, station dwell time required time data and station dwell time buffer time data. The station-to-station running time required time data indicates first required time that is time required for a train running between a departure station and an arrival station. The station-to-station running time buffer time data indicates first buffer time that is buffer time that is allowed to absorb a delay of the train, which is obtained by subtracting the first required time from running time of the train which is set as a target value between the departure station and the arrival station. The station dwell time required time data indicates second required time that is time required for the train stopping at the arrival station. The station dwell time buffer time data indicates second buffer time that is buffer time that is allowed to absorb a delay of the train, which is obtained by subtracting the second required time from dwell time of the train which is set as a target value of the arrival station. The display processor displays a timetable of the train in which at least the first required time and the first buffer time are placed as items about running time of the train and at least the second required time and the second buffer time are placed as items about dwell time of the train.

FIG. 1 is a diagram showing an example of a configuration of a train operation planning support system 100 according to the embodiment.

As shown in FIG. 1, the train operation planning support system 100 is configured by a processor 10, a memory 20, a storage device 30, a display device 40 and an input device 50. The train operation planning support system 100 causes the processor 10 to execute a train run curve calculation program 21 stored in the memory 20 to achieve a train run curve calculator 11, and causes the processor 10 to execute a timetable creation program 22 stored in the memory 20 to achieve a timetable creator 12. The train run curve calculator 11 creates a train run curve (distance-speed curve, distance-time curve) to make required time between adjacent two stations the shortest, for example. To calculate a train run curve to make the required time the shortest, various known methods can be applied. When there are one or more stations between designated two stations, the train run curve calculator 11 calculates a train run curve with the one or more stations as nonstop stations. Alternatively, the train run curve calculator 11 may receive designation of a starting station, a stop station and a terminal station to calculate train run curves between these stations at once. In other words, the train run curve calculator 11 may calculate a train run curve for each of train types such as local trains and express trains. The train run curve calculator 11 presents buffer time (first buffer time) included in station-to-station running time and a user interface to adjust the first buffer time. The user interface of the train run curve calculator 11 will be described later.

The timetable creator 12 receives designation of, for example, a starting station, departure time of the starting station, a terminal station and a train type to create a train timetable. The timetable creator 12 presents buffer time (second buffer time) included in station dwell time and a user interface to adjust the second buffer time. The timetable creator 12 also presents buffer time (first buffer time) included in station-to-station running time and a user interface to adjust the first buffer time. The user interface of the timetable creator 12 will be described later.

Note that the functional units of the train run curve calculator 11 and the timetable creator 12 can be achieved as hardware, such as a dedicated electronic circuit, regardless of software.

Furthermore, the train operation planning support system 100 may be constructed by a single computer and, as shown in FIG. 2, by a plurality of computers (a web application server 1, a database server 2 and a web client browser 3). For example, the web application server 1 may receive a request from the web client browser 3 via the Internet N, perform various processes using data stored in the database server 2 (database 2A) and data received from the web client browser 3, and return the results to the web client browser 3. In other words, the web application server 1 may fill the role of the processor 10 shown in FIG. 1, the database server 2 may fill the role of the storage device 30 shown in FIG. 1, and the web client browser 3 may fill the role of the display device 40 shown in FIG. 1. The role of the input device 50 shown in FIG. 1 may be filled by a keyboard, a mouse (3A) and the like to perform various operations on the display screen of the web client browser 3. The web application server 1 can receive a request from a plurality of web client browsers 3 to perform various processes in parallel in response to the request.

Returning to FIG. 1, the configuration of the train operation planning support system 100 will continue to be described.

The storage device 30 first stores train characteristics data 31, speed limit data 32, ground equipment data 33 and train run curve data 34 as data on the train run curve calculator 11. The train characteristics data (train run curve) 31 is data on operations (acceleration, coasting, constant speed, brake) which can be selected during train operation and running speed based on the operations. The speed limit data 32 is data on a speed limit in a train running section. The ground equipment data 33 is data on ground equipment in a train running section. The ground equipment includes gradients and curves as well as stations and signals.

The train run curve calculator 11 creates a designated station-to-station train run curve using the train characteristics data 31, speed limit data 32 and ground equipment data 33. The train run curve data 34 is data on a train run curve calculated by the train run curve calculator 11.

Also, the storage device 30 secondly stores station-to-station running time data 35, station dwell time data 36 and timetable data 37 as data on the timetable creator 12. The station-to-station running time data 35 is data created during the calculation of the train run curve data 34, and includes station-to-station running time required time data 35A and station-to-station running time buffer time data 35B. The station dwell time data 36 is data created during the creation of the ground equipment data 33, more particularly, created during the creation of data on stations, and includes station dwell time required time data 36A and station dwell time buffer time data 36B.

The station-to-station running time required time data 35A is data on the required time of station-to-station running time calculated based on the train run curve data 34. The station-to-station running time buffer time data 35B is data on buffer time for absorbing a delay in station-to-station running time, which is set by an operator and the like. Adding time represented by the station-to-station running time required time data 35A and time represented by the station-to-station running time buffer time data 35B corresponds to target station-to-station running time. Alternatively, the required time of station-to-station running time can be subtracted from the target station-to-station running time to obtain buffer time of the station-to-station running time. Hereinafter, the target station-to-station running time may simply be referred to as running time.

Also, the station dwell time required time data 36A is data on the required time of the station dwell time set by an operator and the like. The station dwell time buffer time data 36B is data on buffer time for absorbing a delay in station dwell time, which is also set by an operator and the like. Adding time represented by the station dwell time required time data 36A and time represented by the station dwell time buffer time data 36B corresponds to target station dwell time. Hereinafter, the target station dwell time may simply be referred to as dwell time.

In FIG. 1, the station-to-station running time data 35 and the station dwell time data 36 are shown as different data structures, but they may be present as a single data structure. In other words, the train operation planning support system 100 of the present embodiment has a unique data structure which includes at least one of the station-to-station running time data 35 and the station dwell time data 36, and in which the station-to-station running time data 35 includes the station-to-station running time required time data 35A and the station-to-station running time buffer time data 35B and the station dwell time data 36 includes the station dwell time required time data 36A and the station dwell time buffer time data 36B. In this data structure, the station-to-station running time required time data 35A, the station-to-station running time buffer time data 35B, the station dwell time required time data 36A and the station dwell time buffer time data 36B may physically be present separately, and the station-to-station running time data 35 including the station-to-station running time required time data 35A and the station-to-station running time buffer time data 35B and the station dwell time data 36 including the station dwell time required time data 36A and the station dwell time buffer time data 36B may logically be constituted.

The station-to-station running time data 35 may further include not only the station-to-station running time required time data 35A and the station-to-station running time buffer time data 35B but also data representing target station-to-station running time that is a combined value of time indicated by the data 35A and data 35B. The station dwell time data 36 may further include not only the station dwell time required time data 36A and the station dwell time buffer time data 36B but also data representing target station-to-station running time that is a combined value of time indicated by the data 36A and data 36B.

The timetable creator 12 creates a timetable of a designated train using the station-to-station running time data 35 including the station-to-station running time required time data 35A and the station-to-station running time buffer time data 35B and the station dwell time data 36 including the station dwell time required time data 36A and the station dwell time buffer time data 36B. The timetable data 37 is data on a timetable created by the timetable creator 12. The timetable creator 12 comprises a function (acquisition processor) of acquiring the station-to-station running time required time data 35A, the station-to-station running time buffer time data 35B, the station dwell time required time data 36A and the station dwell time buffer time data 36B, a function (display processor) of displaying a timetable in which times indicated by these data are placed, and a function (editing processor) of editing times placed on the timetable, in order to support the creation of the timetable.

The principle of creating a timetable whose robustness is secured, will be described with reference to FIG. 3.

In FIG. 3, the circled number indicated by symbol a1 represents the train arrival time and departure time at each station as nodes. The arrow of a one-dot-one-dash line indicated by symbol a2 and connecting nodes of stations, represents station-to-station running time. The arrow of a solid line indicated by symbol a3 and connecting nodes of the same station, represents station dwell time.

When a timetable is created, two factors are taken into consideration. One is station-to-station running time (arrow a2) and station dwell time (arrow a1) of each train. The other is an operation interval (arrow of a broken line connecting nodes of the same station) between a preceding train and its following train, which is referred to as headway. The time interval in which the following train can safely run along the planned train run curve and does not collide with the preceding train, will be referred to as a headway value (time). The headway value can be determined by creating a headway distribution curve from two train run curves of a preceding train run curve and a following train run curve. Though not described in detail here, in the configuration of the train operation planning support system 100 of the present embodiment shown in FIG. 1, headway value data created with the calculation of the train run curve data 34 by the train run curve calculator 11 acts on the creation of the timetable data 37 by the timetable creator 12.

In addition, there is a ground at each position for the first element of the station-to-station running time and the station dwell time of each train for use in creating the timetable.

For example, the station-to-station running time can correctly be calculated because the running can be simulated by calculating a train run curve. However, the station-to-station running time varies according to a difference in train car run, a change in the coefficient of friction on rails due to the weather, and a change in train body weight due to a variation in the number of passengers. For this reason, the case where a train runs the slowest is often adopted as the station-to-station running time.

This means that in the real world a train arrives at a station earlier than the set station-to-station running time. A difference between the running time for which a train actually run and the set station-to-station running time is buffer time, and functions as a buffer that contributes to the robustness of the time table. Like the buffer time regarding the station-to-station running time, buffer time regarding the station dwell time also functions as a buffer.

Since one train runs based upon the accumulation of station-to-station running time and station dwell time, it can complete running with the total value of a combined value of station-to-station running time required time and that of station dwell time required time if constraint of departure time is excluded. In other words, a combined value of station-to-station running time buffer time and that of station dwell time buffer time correspond to time that can be recovered even though a delay is caused. If a delay falls within the value, a basically recoverable robust timetable can be created.

In the train operation planning support system 100 of the present embodiment, therefore, the station-to-station running time and station dwell time including buffer time (buffer) are further divided into two to create a timetable. Specifically, the station-to-station running time data 35 is divided into station-to-station running time required time data 35A and station-to-station running time buffer time data 35B and the station dwell time data 36 is divided into station dwell time required time data 36A and station dwell time buffer time data 36B to perform creation of the timetable 37 by the timetable creator 12.

For example, the station-to-station running time required time can be calculated with high accuracy by simulating the running of a train as described above. The station dwell time required time can be calculated by operation technologies based upon station operation experience or by simulation about passenger entrainment and detrainment with respect to doors. Margin time is set for each station-to-station and for each station stopping to create a timetable by the station-to-station running time and station dwell time corresponding to the addition of the buffer time. If a timetable is created while maintaining the contents of the required time and buffer time, the robustness of the timetable can be evaluated numerically.

FIG. 4 is a diagram showing an example of a format of the station-to-station running time data 35.

The station-to-station running time data 35 is data created as, for example, one record for every adjacent two stations and, as shown in FIG. 4, includes fields of a departure station (b11), an arrival station (b12), required time (b13), buffer time (b14) and running time (b15).

As the station-to-station running time data 35, conventionally, running time from a station of the departure station field b11 to a station of the arrival station field b12 is only stored in the running time field b15. In contrast, in the train operation planning support system 100, the required time and buffer time obtained by subdividing the running time are stored in each of the fields (required time field b13 and buffer time field b14).

The addition of time of the required time field b13 and time of buffer time field b14 corresponds to time of the running time field b15. In other words, time obtained by subtracting the time of the required time field b13 from the time of the running time field b15 corresponds to the time of buffer time field b14.

FIG. 5 is a diagram showing an example of a format of the station dwell time data 36.

The station dwell time data 36 is data created as, for example, one record for every station and, as shown in FIG. 5, includes fields of a station (b21), required time (b22), buffer time (b23) and dwell time (b24).

As the station dwell time data 36, conventionally, dwell time at a station of the station field b21 is only stored in the dwell time field b24. In contrast, in the train operation planning support system 100, the required time and buffer time obtained by subdividing the dwell time are stored in each of the fields (required time field b22 and buffer time field b23).

The addition of time of the required time field b22 and time of buffer time field b23 corresponds to time of the dwell time field b24. In other words, time obtained by subtracting the time of the required time field b22 from the time of the dwell time field b24 corresponds to the time of buffer time field b23.

As described above, the train operation planning support system 100 includes station-to-station running time data 35 and station dwell time data 36 having a unique data structure, clarifying the buffer time which was conventionally included in the running time and dwell time and not clarified. Including the station-to-station running time data 35 and station dwell time data 36 having a unique data structure clarifying the buffer time, the train operation planning support system 100 can, for example, evaluate the robustness of a timetable numerically. Evaluating the robustness of a timetable numerically will be described later. As described above, the station-to-station running time data 35 and station dwell time data 36 may be present as a single data structure.

A user interface of the train run curve calculator 11 will be described below with reference to FIG. 6 and FIG. 7. More specifically, the following is a description of an example of creating the station-to-station running time data 35 including the station-to-station running time required time data 35A and station-to-station running time buffer time data 35B during the calculation of a train run curve in the train operation planning support system 100.

Figure 6:
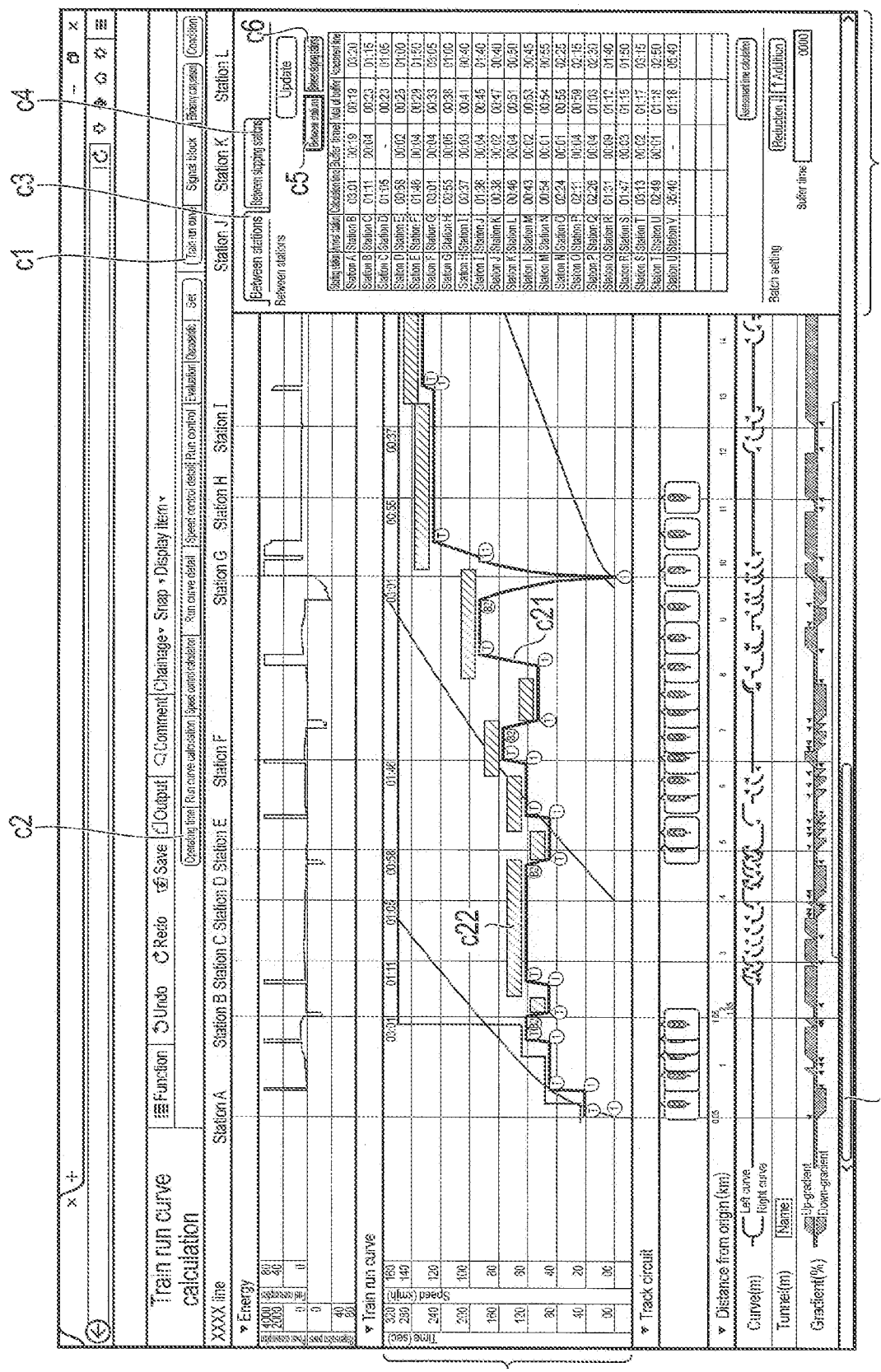
FIG. 6 is a first diagram showing an example of a screen displayed while the train operation planning support system according to the embodiment is calculating a train run curve.

FIG. 6 shows an example of a train run curve calculation screen displayed on the display device 40 by the train run curve calculator 11. The train run curve calculation screen can be displayed by selecting a train run curve tab indicated by symbol c1 by use of a pointing device such as a mouse, namely, the input device 50.

It is assumed here that a starting station, a stopping station and a terminal station have already been designated, train run curves between the stations have been calculated, and the calculated train run curves are displayed in a field indicated by symbol c11. The segment represented by symbol c21 is a train run curve. Note that the segment indicated by symbol c22 represents a section in which a speed limit is set and a speed. In addition, information of signals, curves, gradients, etc., is also displayed on the train run curve calculation screen. When an running time tab indicated by symbol c2 is selected during the display of the train run curve c21, the train run curve calculator 11 displays a toolbox to set running time in a field indicated by symbol c12 on the right side of the screen, based on the displayed train run curve c21. A display target section of the train run curve c21 can be moved by a scroll bar c23 at the bottom of the screen.

In this toolbox, a station-to-station tab indicated by symbol c3 and a stopping station-to-stopping station tab indicated by symbol c4 are placed. When the station-to-station tab c3 is selected, the train run curve calculator 11 displays running time of all intervals between stations including nonstop stations in the toolbox. FIG. 6 shows an example of display of the toolbox when the station-to-station tab c3 is selected. When the running time tab c2 is selected, the train run curve calculator 11 displays a toolbox, which is to be displayed when the station-to-station tab c3 is selected, as the initial state.

The station-to-station running time is indicated by a departure station, an arrival station, calculation time, buffer time, a total of margins and assessment time (standard time evaluated after calculation). The calculation time is running time from the departure station to the arrival station calculated from the displayed train run curve. As the buffer time, 0 minutes 0 seconds is displayed as the initial value. The total of margins is a cumulative value of buffer time from the starting station. As the total of margins, 0 minutes 0 seconds is also displayed as the initial value because the initial value of the buffer time is 0 minutes 0 seconds. The assessment time is an addition value of the calculation time and the buffer time and is set as target running time from the departure station to the arrival station. As the assessment time, the same time as the calculation time is displayed as the initial value.

The operator (the train operating company) edits the station-to-station buffer time while seeing the train run curve c21 displayed with information of signals, curves, and gradients, etc. The station-to-station buffer time is determined based upon the distance between stations, the up-gradient, etc., for example. The method of determining the buffer time is not limited to a specific method.

When buffer time between certain stations is edited, the train run curve calculator 11 edits the assessment time between the stations in a chain reaction. More specifically, the assessment time between the stations is updated to an addition value obtained by adding the calculation time to the edited buffer time. The train run curve calculator 11 also edits a total of margins between the stations and its subsequent total of margins in a chain reaction in order to reflect a difference between the buffer time that has not been edited and the buffer time that has been edited.

When assessment time between certain stations is edited, the train run curve calculator 11 edits the buffer time between the stations in a chain reaction. More specifically, the buffer time between the stations is updated to a subtraction value obtained by subtracting the calculation time from the edited assessment time. The train run curve calculator 11 also edits a total of margins between the stations and its subsequent total of margins in a chain reaction in order to reflect a difference between the buffer time that has not been edited and the buffer time that has been edited.

As described above, the train operation planning support system 100 can clarify the assessment time by dividing it into calculation time and buffer time to perform more precise editing, though conventionally only the assessment time including station-to-station buffer time was edited. Since the assessment time is clarified by dividing it into calculation time and buffer time, the train operation planning support system 100 can grasp the station-to-station buffer time as a numerical value and also grasp a total of margins from the starting station as a numerical value. In other words, the train operation planning support system 100 can determine station-to-station assessment time, while evaluating buffer time acting as a buffer to absorb a delay in running time by a numerical value. The assessment time so determined is stored in the storage device 30 as station-to-station running time data 35. The station-to-station running time data 35 includes the station-to-station running time required time data 35A and the station-to-station running time buffer time data 35B. The calculated train run curve is stored in the storage device 30 as the train run curve data 34.

In the toolbox, a station-to-station button indicated by symbol c5 and a stopping station-to-stopping station button indicated by symbol c6 are placed. When the stopping station-to-stopping station button c6 is selected, the train run curve calculator 11 displays a toolbox presenting running time between stopping stations excluding nonstop stations (field c12-2). FIG. 7 shows an example of a toolbox displayed when the stopping station-to-stopping station button c6 is selected. The calculation time, buffer time, total of margins and assessment time shown in FIG. 7 correspond to the total value of the departure station to nonstop station, nonstop station to nonstop station, and nonstop station to arrival station shown in FIG. 6. Selecting the stopping station-to-stopping station button c6 in the toolbox shown in FIG. 6 to display the toolbox shown in FIG. 7, for example, the operator can grasp the buffer time acting as a buffer to absorb a delay in running time in units of stopping station-to-stopping station. When the station-to-station button c5 is selected from the toolbox shown in FIG. 7, the display is returned to the toolbox shown in FIG. 6.

Even when the stopping station-to-stopping station tab C4 is selected from the toolbox, the train run curve calculator 11 displays a toolbox that presents running time between stopping stations excluding nonstop stations. In this toolbox, the operator can edit the buffer time and assessment time in units of stopping station-to-stopping station. The operator selects the station-to-station button c5 from the toolbox to grasp the buffer time acting as a buffer to absorb a delay in running time in units of station-to-station.

Referring to FIG. 8, FIG. 9, FIG. 10 and FIG. 11, the user interface of the timetable creator 12 will be described. Below is a more detailed description of an example of creating the timetable data 37 using the station-to-station running time data 35 including the station-to-station running time required time data 35A and station-to-station running time buffer time data 35B and the station dwell time data 36 including the station dwell time required time data 36A and station dwell time buffer time data 36B. As described above, the station dwell time data 36 is created when data about stations in the ground equipment data 33 is created. As a method of creating the data 36, a variety of known methods can be applied. Here, a description of what user interface is used to create the ground equipment data 33, how the station dwell time data 36 is created according to the creation of the data 33, and the like will be omitted. As has been described with reference to FIG. 6 and FIG. 7, the station-to-station running time data 35 is created when the train run curve data 34 is created by the train run curve calculator 11.

First, an example of calculating a reference value (standard running time) of the timetable of a train running in a certain section will be described with reference to FIG. 8 and FIG. 9.

Figure 8:
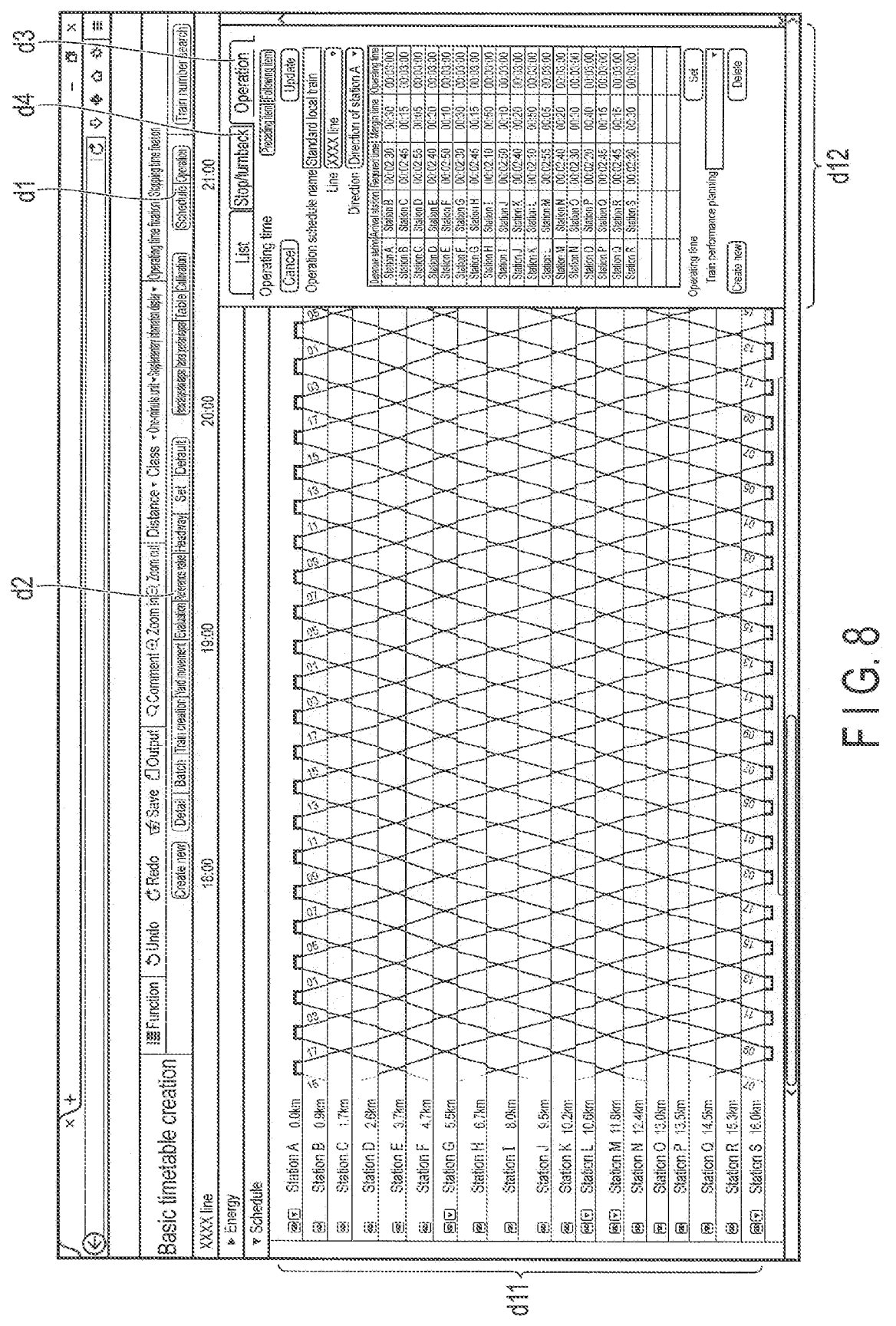

FIG. 8 shows an example of a basic timetable creation screen displayed on the display device 40 by the timetable creator 12. The basic timetable creation screen can be displayed by selecting a timetable tag indicated by symbol d1 by use of a pointing device such as a mouse, namely, the input device 50.

It is assumed here that a starting station and a terminal station have already been designated and an operation timetable in which they are arranged in order of train running direction is displayed in the field indicated by symbol d11. The operation timetable can be displayed in the form of replacing the vertical and horizontal axes by tab operation. In FIG. 8, the vertical axis indicates a distance and the horizontal axis indicates time. When a reference value tag indicated by symbol d2 is selected while the operation timetable is displayed, the timetable creator 12 displays a toolbox to set a reference value of the timetable of the train running in the section for each train type in the field represented by symbol d12 on the right side of the screen.

In the toolbox, an operation tab indicated by symbol d3 and a dwell/turnback tab indicated by symbol d4 are placed. When the operation tab d3 is selected, the time table creator 12 presents the required time, buffer time and running time of station-to-station (departure station to arrival station) operation in the toolbox. FIG. 8 shows an example of displaying the toolbox when the operation tab d3 is selected. During the display of the toolbox, the time table creator 12 presents the value of the station-to-station running time data 35 as the initial value. Here, the running time corresponds to the assessment time at the time of calculation of a train run curve. In other words, the running time is an addition value of the required time and buffer time. Like the buffer time and assessment time at the time of calculation of a train run curve, the buffer time and running time can be edited at this time. When one of them is edited, the time table creator 12 edits the other in a chain reaction thereto.

When the dwell/turnback tab d4 is selected, the time table creator 12 displays a toolbox to present the required time, buffer time and dwell time of stopping of each station (field d12-2). FIG. 9 shows an example of displaying the toolbox when the dwell/turnback tab d4 is selected. During the display of the toolbox, the time table creator 12 presents the value of the station dwell time data 36 as the initial value.

The dwell time is an addition value of the required time and the buffer time. When one of the required time, buffer time and dwell time at a certain station is edited, the time table creator 12 edits at least one of the others in a chain reaction thereto. This point will be described later.

Figure 9:
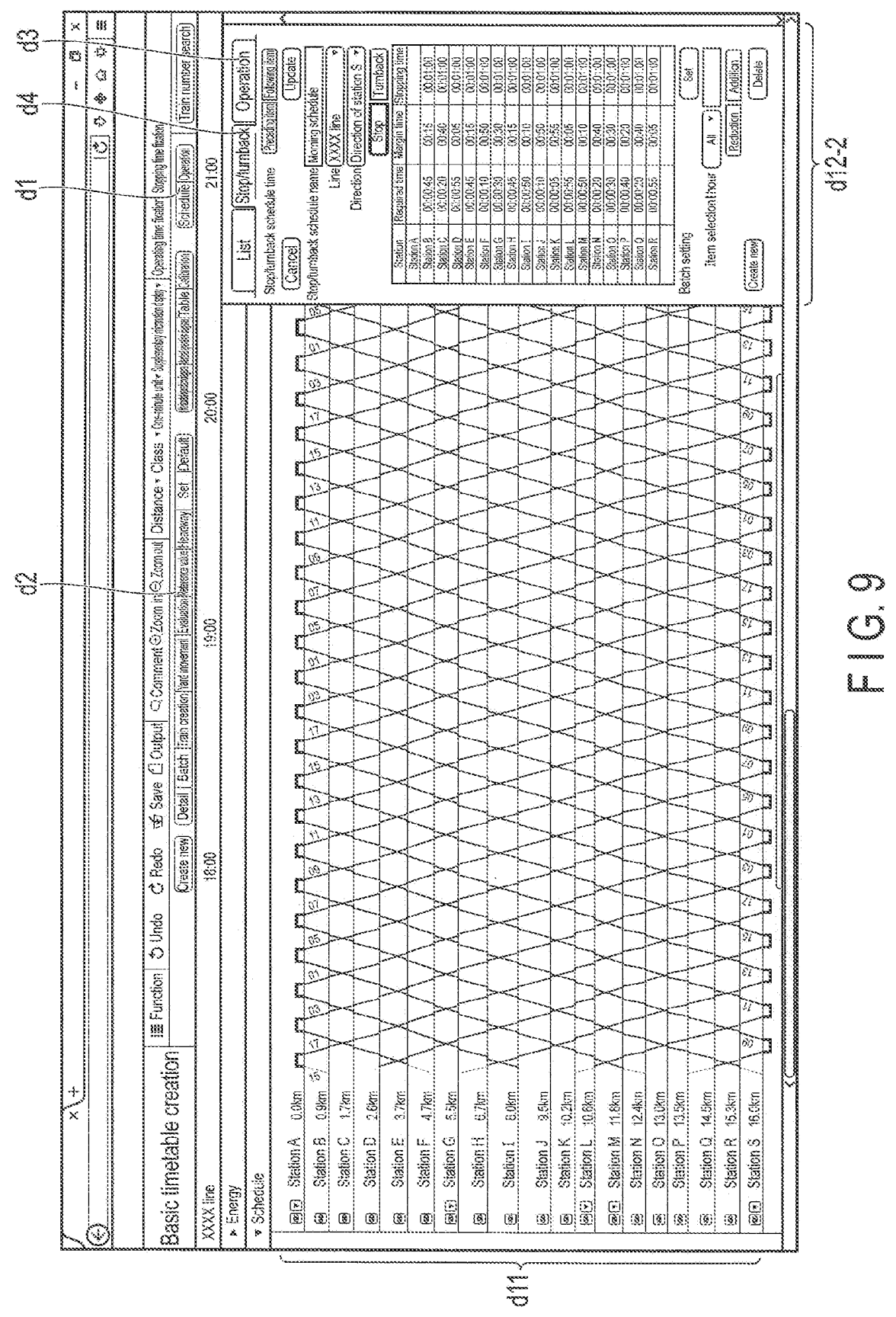

The reference value regarding the running time set in the toolbox shown in FIG. 8 and the reference value (standard dwell time) regarding the dwell time set in the toolbox shown in FIG. 9 are each stored in the storage device 30 as one of the timetable data 37.

An example of creating a timetable of each train using the reference value of the timetable created as described above, will be described with reference to FIG. 10 and FIG. 11.

Figure 10:
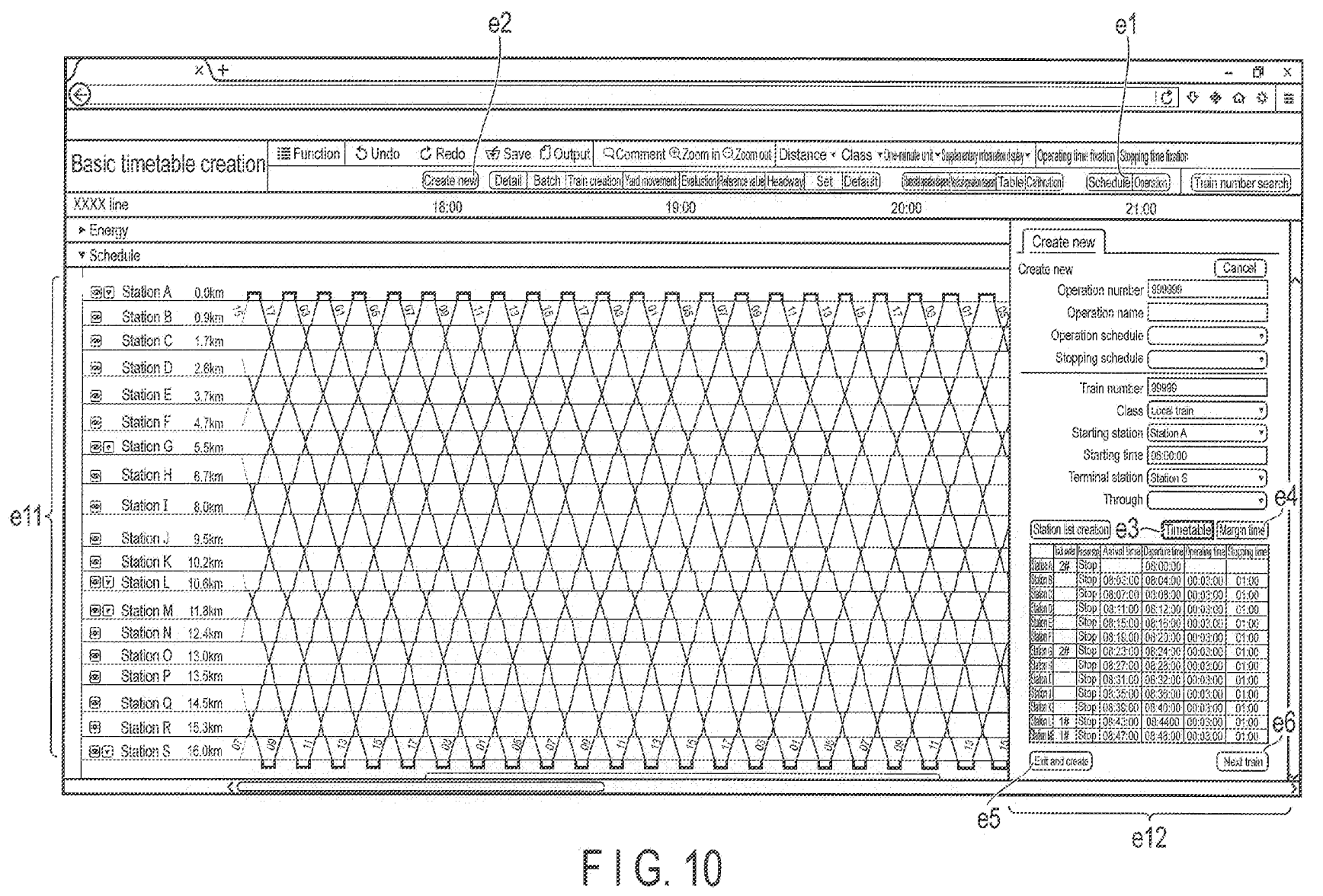

Like FIG. 8, FIG. 10 also shows an example of the basic timetable creation screen displayed on the display device 40 by the timetable creator 12. As described above, the basic timetable creation screen can be displayed by selecting a timetable tag indicated by symbol e1 by use of a pointing device such as a mouse, namely, the input device 50.

When a new creation tag indicated by symbol e2 is selected while the operation timetable is displayed in the field e11, the timetable creator 12 displays a toolbox to create a timetable of a certain train in the field indicated by symbol e12 on the right side of the screen.

In the toolbox, a timetable button indicated by symbol e3 and a buffer time button indicated by symbol e4 are placed. The timetable button e3 is a button to select a timetable mode to create the timetable of the train by setting the arrival time, departure time, running time and dwell time at each station. FIG. 10 shows an example of displaying a toolbox when the timetable mode is selected. When a class (train type), a starting station, starting time, a terminal station, etc., are designated, the timetable creator 12 calculates the arrival time and departure time at each station using the reference value (standard running time) regarding the running time that is one of the timetable data 37, and presents them as the initial value together with the running time in order of station according to the train running direction. The timetable creator 12 also presents the reference value (standard dwell time) regarding the dwell time, which is also one of the timetable data 37, as the initial value of the dwell time in order of station according to the train running direction. The operator edits the arrival time, departure time, running time and dwell time as appropriate to have values other than the initial value to create a timetable. The reason for editing them to have values other than the initial value is, for example, to reflect the number of passengers that increases and decreases by time of day.

In this toolbox, an exit and create button indicated by symbol e5 and a next train button indicated by symbol e6 are placed. When the exit and create button e5 is operated, the timetable creator 12 creates a timetable of a train based on the contents of editing in the toolbox and stores it in the storage device 30 as timetable data 37. The timetable creator 12 also draws line segments representing the created timetable on the operation timetable of the field e11, which are referred to as streaks or the like. When the next train button e6 is operated, the timetable creator 12 displays a toolbox for another train in the field e12.

Figure 11:
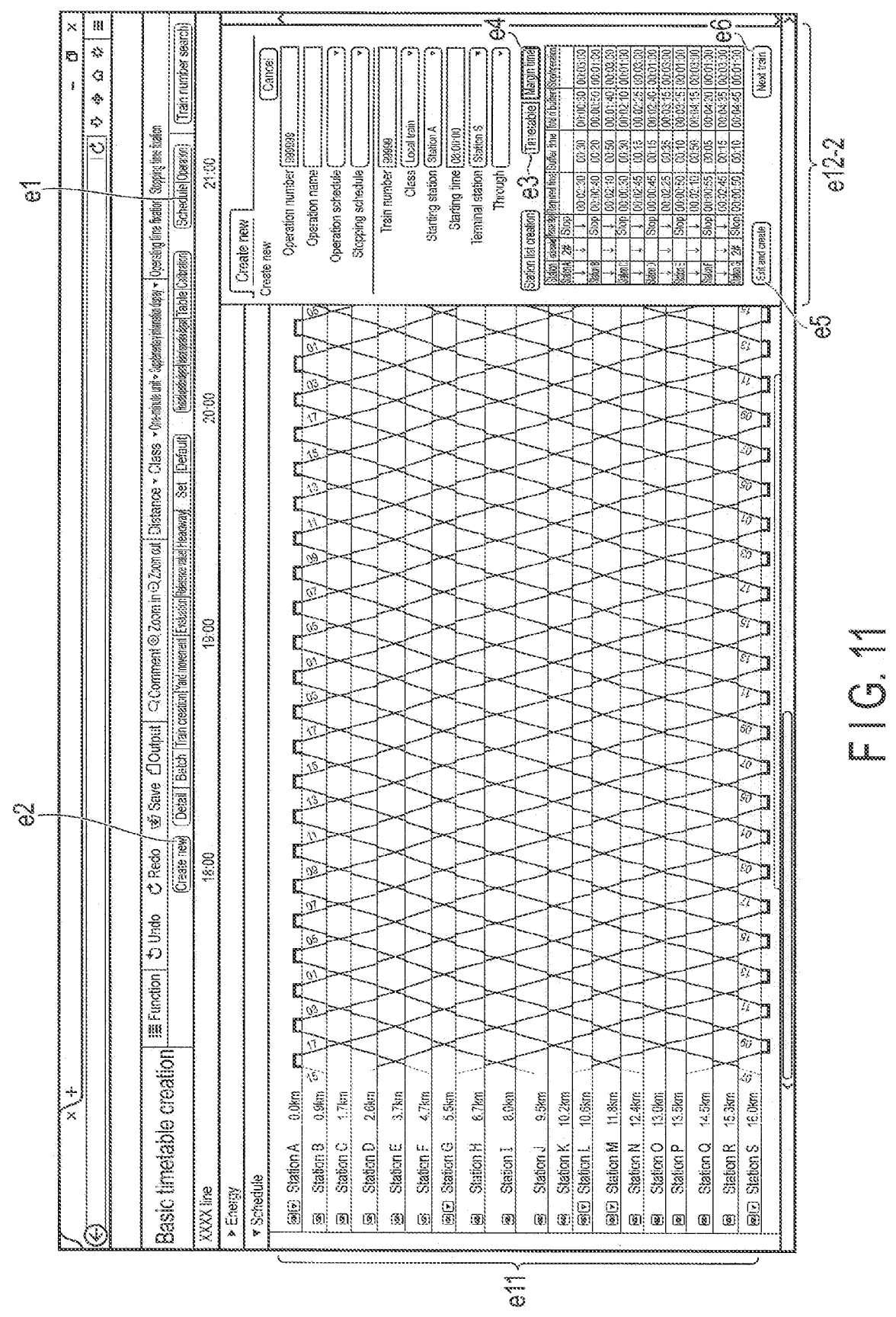

A buffer time button e4 is a button to select a buffer time mode to create a timetable of a train by setting the station-to-station running time or the buffer time of the running time and the station dwell time or the buffer time of the dwell time. FIG. 11 shows an example of displaying a toolbox when the buffer time mode is selected (field e12-2). When a class (train type), a starting station, starting time, a terminal station, etc., are designated, the timetable creator 12 presents a reference value (standard running time) regarding the running time and a reference value (standard dwell time) regarding the dwell time, each of which is one of the timetable data 37, alternately as the initial values of the running time and dwell time in order of station according to the train running direction. In the buffer time mode, the timetable creator 12 totalizes the buffer time of the running time and that of the dwell time in time series and presents the totalized values in time series. The operator edits the buffer time of the running time and that of the dwell time as appropriate to have values other than the initial value to create a timetable.

Since the operator can grasp the buffer time of the station-to-station running time and that of the dwell time at each station in the buffer time mode, the operator can create a timetable while evaluating the robustness numerically. Since, furthermore, the operator can also grasp the total of margins, the operator can create a timetable while considering the quick deliverability having a tradeoff relationship with the robustness.

In this toolbox, too, the exit and create button e5 and the next train button e6 are placed. When the exit and create button e5 is operated, the timetable creator 12 creates a timetable of the train based on the contents of editing in the toolbox and stores it in the storage device 30 as timetable data 37. The timetable creator 12 also draws line segments representing the created timetable on the operation timetable of the field e11. When the next train button e6 is operated, the timetable creator 12 displays a toolbox for another train in the field e12-2.

In the train operation planning support system 100, after a plurality of train timetables are created, a segment line representing a target train timetable can be selected from among a plurality of line segments each representing a timetable of one train, which are drawn on the operation timetable, and adjust the selected timetable by the same procedure as described with reference to FIG. 10 and FIG. 11.

FIG. 12 schematically shows a plurality of line segments (streaks) each representing a timetable of one train, which are drawn on the operation timetable displayed in the field e11 of FIG. 10.

In FIG. 12, the circle indicated by symbol f1 represents a starting point and the triangle indicated by symbol f2 represents a terminal point. FIG. 12 thus shows timetables (f11, f12, f13) of three trains in which station A is a starting station and station D is a terminal station and timetables (f21, f22, f23) of three trains in which station D is a starting station and station A is a terminal station. When the operator wishes to adjust the timetable indicated by line segment f12, the operator selects the line segment f12 by use of the pointing device such as a mouse, namely, the input device 50.

Figure 13A:
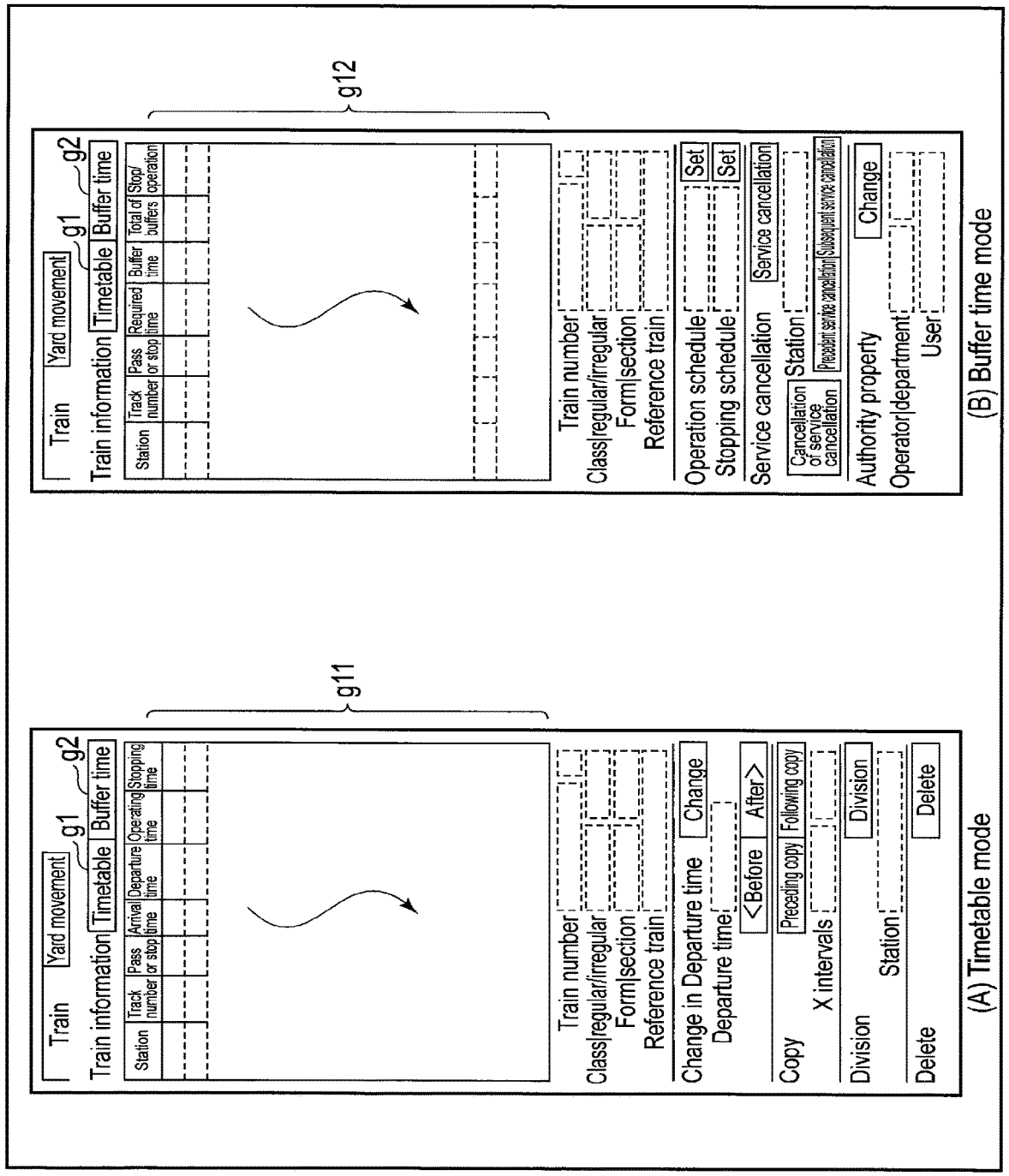
FIG. 13A is a diagram showing an example of displaying a tool box to adjust a timetable by the train operation planning support system according to the embodiment.

Accordingly, a toolbox for the timetable mode shown in (A) of FIG. 13A or a toolbox for the buffer time mode shown in (B) of FIG. 13A is displayed in the field e12 of FIG. 10. Assume here that the toolbox for the timetable mode shown in (A) of FIG. 13A is displayed. In each of the toolboxes, a timetable button g1 and a buffer time button g2 are placed, and one of the toolboxes can be switched to the other. Note that a layout can be shared between a toolbox displayed during the creation of a timetable and a toolbox displayed during the adjustment of a timetable. In other words, a layout can be shared between the toolbox displayed in the field e12 shown in FIG. 10 and the toolbox shown in (A) of FIG. 13A, and a layout can be shared between the toolbox displayed in the field e12-2 shown in FIG. 11 and the toolbox shown in (B) of FIG. 13A.

In the timetable mode, a timetable is adjusted by appropriately editing the arrival time, departure time, running time and dwell time presented in the field g11. In the buffer time mode, a timetable is adjusted by appropriately editing the buffer time of the running time and that of the dwell time displayed alternately in the field g12.

FIG. 13B shows an example of presenting the arrival time, departure time, running time and dwell time presented in the field g11 of the toolbox displayed in the timetable mode.

In the timetable mode, the timetable of a train can be changed by inputting the arrival time, departure time, running time and dwell time.

For example, in most timetable solutions in foreign countries, only the arrival time and departure time are edited. This is an idea of inputting a visible value directly to the train operation. As automatic running devices such as the automatic train operation (ATO) become popular, the problems of mechanical factors decrease. In other words, part of the running time is reproduced with high accuracy. Accordingly, as the dwell time, required time can be decided for each station. The default value of the dwell time naturally varies by time of day. In early stages, a timetable was created by editing only the arrival time and departure time of the arrival time, departure time, running time and running time shown in FIG. 13B. However, as this progresses, timetable creation has been developed by determining starting time and editing the dwell time instead of editing the running time reproduced with high accuracy.

FIG. 13C shows an example of presenting the buffer time of the running time and that of the dwell time in a field g12 of the toolbox displayed in the buffer time mode.

Once a concept of making a timetable robust is derived, a further concept of a buffer is done. Though the conventional train operation planning support system had a concept of a buffer, it could not handle the buffer as a system. The train operation planning support system 100 according to the present embodiment further divides the dwell time and the running time into required time and buffer time (buffer) and manages them. As described above, a timetable has been created so far by determining starting time and using running time and dwell time; however, in the train operation planning support system 100 according to the present embodiment, as shown in FIG. 13C, the starting time is determined, the running time (even rows) can be separately input as required running time and margin running time, and the dwell time (odd rows) can be separately input as required dwell time and margin dwell time. In the train operation planning support system 100 of the present embodiment, therefore, a timetable can be created while seeing the buffer time included in a train and thus a train operation can be planned while seeing how much a delay due to the buffer can be allowed. In other words, in the train operation planning support system 100 of the present embodiment, the creation of a timetable is further developed by editing the buffer time (buffer).

Note that as shown in FIG. 13B and FIG. 13C, a nonstop station such as station C can be handled as a station at which dwell time is 0 seconds.

Below is a description of a case where when one of the required time, buffer time, and running time or dwell time regarding running time between stations or dwell time at a station is edited in buffer time mode during creation or adjustment of a timetable, at least one of the others is edited in a chain reaction thereto. It is assumed here that the minimum unit of sampling time is 5 seconds. The minimum unit of sampling is the minimum unit of time interval in which a signal is controlled. It is also assumed that the required time, buffer time, and running time or dwell time (dwell/turnback time) between stations or at a station, none of which has been edited, 2 minutes 13 seconds, 17 seconds, and 2 minutes 30 seconds. Though the required time for the running time between stations during the adjustment of a timetable can be edited in terms of specifications, the editing is performed exclusively during the creation of a train run curve. Here, the dwell time of the dwell/turnback time is time during which a train stops at a way station, and the turnback time is time during which a train stops for its turn back at a terminal station.

Referring first to FIG. 14A, FIG. 14B, FIG. 14C and FIG. 14D, chain editing of buffer time in a case where the required time for dwell time (dwell/turnback time) at a station is edited will be described. In the case of editing of the required time, the dwell time (dwell/turnback time) is not edited in a chain reaction. In addition, since the chain editing of the buffer time during the editing of the required time for station-to-station running time is carried out in a similar fashion, its description will be omitted here.

FIG. 14A shows an example of a case where the required time is changed to a large value within a range of dwell/turnback time.

When the required time is changed to increase from 2 minutes 13 seconds to 2 minutes 22 seconds which is shorter than the dwell/turnback time of 2 minutes 30 seconds, the timetable creator 12 changes the buffer time from 17 seconds to 8 seconds to subtract the increased 9 seconds from the buffer time as well as changes the required time to 2 minutes 22 seconds. Note that the timetable creator 12 may calculate new buffer time by subtracting the edited required time from the dwell/turnback time.

FIG. 14B shows an example of a case where the required time is changed to a large value that exceeds the dwell/turnback time.

When the required time is changed to increase from 2 minutes 13 seconds to 2 minutes 44 seconds that exceeds the dwell/turnback time of 2 minutes 30 seconds, the timetable creator 12 changes the buffer time from 17 seconds to −14 seconds to subtract the increased 31 seconds from the buffer time as well as changes the required time to 2 minutes 44 seconds. Note that the timetable creator 12 may calculate new buffer time by subtracting the edited required time from the dwell/turnback time.

The fact that the buffer time is negative time means that a delay will occur, and a delay is caused intentionally at the station. For example, when the total of margins of the running time between other stations and the dwell/turnback time at another station exceeds that value, such editing is also possible.

FIG. 14C shows an example of a case where the required time is changed to a small value.

When the required time is changed to decrease from 2 minutes 13 seconds to 2 minutes 09 seconds, the timetable creator 12 changes the buffer time from 17 seconds to 21 seconds to add the decreased 4 seconds to the buffer time as well as changes the required time to 2 minutes 09 seconds. Note that the timetable creator 12 may calculate new buffer time by subtracting the edited required time from the dwell/turnback time.

FIG. 14D shows an example of a case where the required time is changed to a negative value.

When the required time is changed from 2 minutes 13 seconds to a negative value of −10 seconds, the timetable creator 12 first changes the required time to 0 seconds. In other words, unlike the buffer time, the required time cannot be negative. In addition, the timetable creator 12 changes the buffer time to the same value as the dwell/turnback time. Note that the timetable creator 12 may calculate new buffer time by subtracting the edited required time (0 seconds) from the dwell/turnback time. Furthermore, the fact that the required time is 0 seconds when it is changed to a negative value is a working agreement, and practically such a change is not made.

A case where when buffer time regarding station dwell time (dwell/turnback time) is edited, required time is edited in a chain reaction thereto, will be described with reference to FIG. 15A, FIG. 15B and FIG. 15C. When the buffer time is edited, the dwell time (dwell/turnback time) is not edited in a chain reaction thereto. When buffer time regarding station-to-station running time is edited, the required time is also edited in a chain reaction thereto in the same manner; thus, its description will be omitted.

FIG. 15A shows an example where the buffer time is changed to a large value.

When the buffer time is changed to increase from 17 seconds to 19 seconds, the timetable creator 12 changes the required time from 2 minutes 13 seconds to 2 minutes 11 seconds to subtract the increase of 2 seconds from the required time as well as changes the buffer time to 19 seconds. Note that the timetable creator 12 may calculate new required time by subtracting the edited buffer time from the dwell/turnback time.

FIG. 15B shows an example where the buffer time is changed to a small value.

When the buffer time is changed to decrease from 17 seconds to 11 seconds, the timetable creator 12 changes the required time from 2 minutes 13 seconds to 2 minutes 19 seconds to add the decrease of 6 seconds to the required time as well as changes the buffer time to 11 seconds. Note that the timetable creator 12 may calculate new required time by subtracting the edited buffer time from the dwell/turnback time.

FIG. 15C shows an example where the buffer time is changed to a large value that exceeds the dwell/turnback time.

When the buffer time is changed to increase from 17 seconds to 2 minutes 55 seconds that exceeds the dwell/turnback time of 2 minutes 30 seconds, the timetable creator 12 first changes the buffer time to 2 minutes 30 seconds that is the same as the dwell/turnback time. In other words, the buffer time cannot exceed the dwell/turnback time. In addition to this, the timetable creator 12 changes the required time to 0 seconds. Note that the timetable creator 12 may calculate new required time of 0 seconds by subtracting the edited buffer time from the dwell/turnback time. Furthermore, the fact that the buffer time is the same as the dwell/turnback time and the required time is 0 seconds when the buffer time is changed to a large value that exceeds the dwell/turnback time, is a working agreement, and practically such a change is not made.

A case where when dwell/turnback time regarding station dwell time (dwell/turnback time) is edited, buffer time is edited in a chain reaction to the dwell/turnback time, will be described with reference to FIG. 16A, FIG. 16B and FIG. 16C. When running time regarding station-to-station running time is edited, the buffer time is also edited in a chain reaction to the running time in the same manner; thus, its description will be omitted.

FIG. 16A shows an example where the dwell/turnback time is changed to a large value.

When the dwell/turnback time is changed to increase from 2 minutes 30 seconds to 3 minutes 11 seconds, the timetable creator 12 first changes the buffer time from 17 seconds to 58 seconds to add the increase of 41 seconds to the buffer time as well as changes the dwell/turnback time to 3 minutes 11 seconds. Note that the timetable creator 12 may calculate new martin time by subtracting the required time from the edited dwell/turnback time. Then, the timetable creator 12 rounds 3 minutes 11 seconds of the dwell/turnback time up to 3 minutes 15 seconds in units of 5 seconds of the minimum sampling unit and accordingly changes the buffer time to 1 minute 2 seconds of "dwell/turnback time— required time".

FIG. 16B shows an example where the dwell/turnback time is changed to a small value.

When the dwell/turnback time is changed to decrease from 2 minutes 30 seconds to 2 minutes 16 seconds, the timetable creator 12 first changes the buffer time from 17 seconds to 3 seconds to subtract the decrease of 14 seconds from the buffer time as well as changes the dwell/turnback time to 2 minutes 16 seconds. Note that the timetable creator 12 may calculate new martin time by subtracting the required time from the edited dwell/turnback time. Then, timetable creator 12 rounds 2 minutes 16 seconds of the dwell/turnback time up to 2 minutes 20 seconds in units of 5 seconds of the minimum sampling unit and accordingly changes the buffer time to 7 seconds of "dwell/turnback time—required time".

FIG. 16C shows an example where the dwell/turnback time is changed to a value that is smaller than the dwell/turnback time.

When the dwell/turnback time is changed to decrease from 2 minutes 30 seconds to 2 minutes 2 seconds that is shorter than the required time of 2 minutes 13 seconds, the timetable creator 12 first changes the buffer time from 17 seconds to −11 seconds to subtract the decrease of 28 seconds from the buffer time as well as changes the dwell/turnback time to 2 minutes 2 seconds. Note that the timetable creator 12 may calculate new martin time by subtracting the required time from the edited dwell/turnback time. Then, the timetable creator 12 rounds 2 minutes 2 seconds of the dwell/turnback time up to 2 minutes 5 seconds in units of 5 seconds of the minimum sampling unit and accordingly changes the buffer time to—8 seconds of "dwell/turnback time—required time".

As described above, the fact that the buffer time is negative time means that a delay will occur, and a delay is caused intentionally at the station. For example, when the total of margins of the running time between other stations and the dwell/turnback time at another station exceeds that value, such editing is also possible.

As described above, in the train operation planning support system 100 according to the present embodiment, the station-to-station running time, which was conventionally included in the station-to-station running time buffer time, is divided into station-to-station running time required time and station-to-station running time buffer time for clarification and also the station dwell time, which was conventionally included in the station-to-station running time buffer time, is divided into station-to-station running time required time and station-to-station running time buffer time for clarification. Thus, each time can be adjusted, the robustness of a timetable can be evaluated numerically by the clarified station-to-station running time buffer time and the station-to-station running time buffer time, and the like.

In other words, the train operation planning support system 100 has a unique data structure which includes at least one of the station-to-station running time data 35 and station dwell time data 36, and in which the station-to-station running time data 35 includes the station-to-station running time required time data 35A and station-to-station running time buffer time data 35B, and the station dwell time data 36 includes the station dwell time required time data 36A and station dwell time buffer time data 36B to make it possible to evaluate the robustness of a timetable numerically, and the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A train operation planning support system comprising:
    a station-to-station running time data storage device that stores station-to-station running time required time data and station-to-station running time buffer time data, the station-to-station running time required time data indicative of a first required time that is time required for a train running station-to-station, the station-to-station running time buffer time data indicative of a first buffer time for absorbing a delay in station-to-station running time,
    a station dwell time required time data storage device that stores station dwell time required time data and station dwell time buffer time data, the station dwell time required time data indicative of a second required time that is time required for the train stopping at the arrival station, the station dwell time buffer time data indicative of a second buffer time that is a buffer time for absorbing a delay in station dwell time;
    a timetable data storage device that stores timetable data;
    a display processor that refers to the station-to-station running time data storage device and the station dwell time required time data storage device to display a timetable of the train in which the first required time and the first buffer time about running time of the train and running time which is obtained k adding the first required time to the first buffer time are placed, second required time and the second buffer time about dwell time of the train and dwell time which is obtained by adding the second required time to the second buffer time are placed, and
    an editing processor that edits, when one of the first required time the first buffer time, and the running time on the timetable is edited, at least one of the others of the first required time the first buffer time, and the running time, and edits, when one of the second required time, the second buffer time, and the target dwell time on the timetable is edited, at least one of the others of the second required time, the second buffer time, and the target dwell time, and stores a result of editing to the timetable data storage device.

2. The train operation planning support system of claim 1, wherein the display processor further places cumulative amounts of the first buffer time and the second buffer time from a starting station of the train to a through station thereof and from the through station thereof to a terminal station thereof on the timetable.

3. The train operation planning support system of claim 2, wherein the display processor further places an item about running time of the train from a starting station of the train to a terminal station thereof and an item about dwell time of the train on the timetable alternately in order of station according to a running direction of the train.

4. The train operation planning support system of claim 1, wherein the display processor further places an item about running time of the train from a starting station of the train to a terminal station thereof and an item about dwell time of the train on the timetable alternately in order of station according to a running direction of the train.

* * * * *